July 24, 1956 — R. G. H. SIU — 2,756,174
METHOD OF FORMING FILAMENTOUS PANELS
Filed Nov. 13, 1953 — 2 Sheets-Sheet 1

INVENTOR
Ralph G. H. Siu
BY W. J. Eccleston, ATTORNEY

July 24, 1956  R. G. H. SIU  2,756,174
METHOD OF FORMING FILAMENTOUS PANELS
Filed Nov. 13, 1953  2 Sheets-Sheet 2
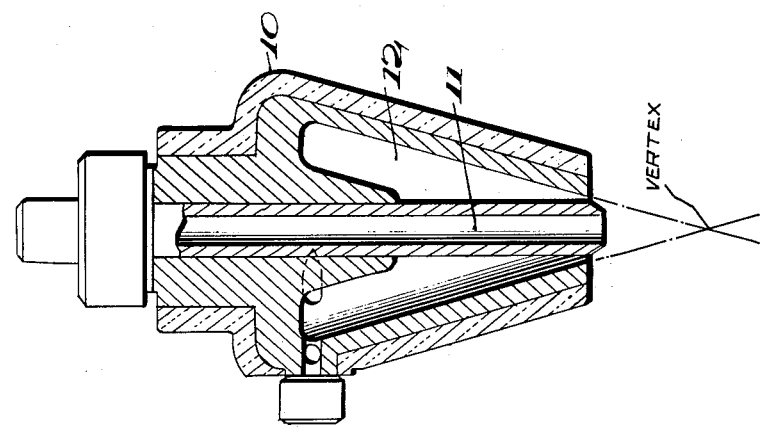
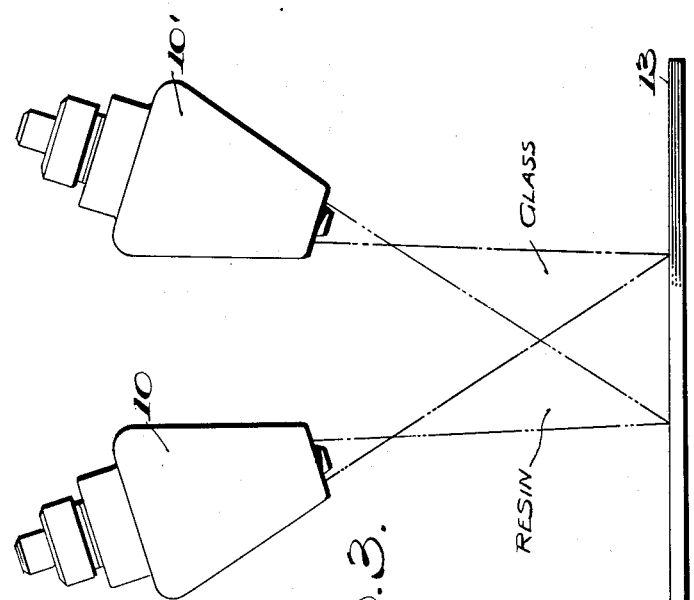
INVENTOR.
Ralph G. H. Siu.
BY
W. J. Eccleston.

UNITED STATES PATENT OFFICE

2,756,174

METHOD OF FORMING FILAMENTOUS PANELS

Ralph G. H. Siu, Philadelphia, Pa.

Application November 13, 1953, Serial No. 392,067

2 Claims. (Cl. 154—101)

(Granted under Title 35, U. S. Code (1952), sec. 266)

The invention described herein, if patented, may be manufactured and used by or for the Government for governmental purposes without the payment to me of any royalty thereon.

This application is a continuation-in-part of my application Serial No. 138,872, filed January 16, 1950, now abandoned.

This invention relates to the preparation of shape-sustaining panels from filament-forming materials, such as resins (synthetic or natural), glass, etc.

Loose wool or mattings from such materials are described in Patent No. 2,571,457, issued October 16, 1951, to R. K. Ladisch. The spraying of molten liquids to form filaments or filamentous masses useful for artificial wool or matting is also described in said patent.

The present invention is distinguishable from the inventions of the aforementioned patent in that panels or building elements are made which are of well defined form, so that they may be handled without change in shape or dimensions. According to the pressure to which these panels are subjected they may be thick and flexible or thin and stiff and capable of being handled like fiber-board and other sheathings. Products of the invention may be used for wall boards, insulating tentage material and insulating purposes in general.

In the accompanying drawings forming a part of this specification,

Fig. 3 is a diagrammatic view of an arrangement of spray nozzles for producing a mixed mass of two different filamentous materials, adapted to be made into a panel in accordance with the present invention; and Fig. 4 is a side elevation, partly in section, of a nozzle of the type illustrated in Fig. 3.

Figure 1:
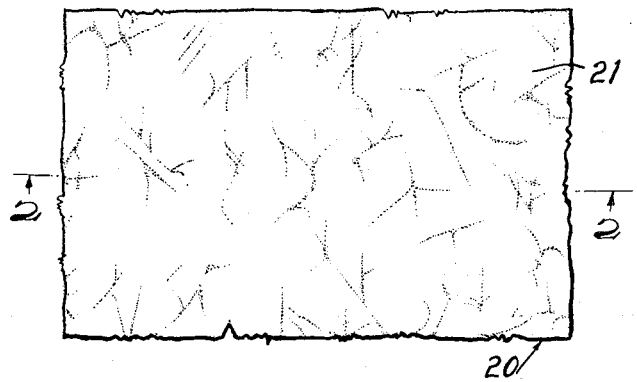
Figure 1 is a front view of a typical panel surface formed by heat and pressure in accordance with the present invention.

In accordance with the invention, the filament-forming material is either melt-sprayed or sprayed from solution, as disclosed in the aforementioned patent, thereby forming a filamentous mass or matting of curled entangled fibers, or a cord or yarn of twisted fibers. The material may be glass, preferably a glass having a relatively low melting point; or it may be polymer, copolymer or polymeric mixture may be selected from the following: polystyrene, polydichlorostyrene, polyamides of the nylon type, polyacrylonitrile, polymethacrylonitrile, polymethyl methacrylate, polymethyl acrylate, polyvinylidene chloride, polyvinyl chloride, polyvinyl carbazole, polyvinyl alcohol, polyvinyl acetate, polyvinyl butyral, polymeric glycol terephthalate, cellulose acetate, cellulose propionate, cellulose acetate butyrate, cellulose nitrate, ethyl cellulose, polyethylene, halogenated polyethylenes, polybutene, polyisobutylene, and silicones.

To effect such spraying a generally conical nozzle like the one disclosed in Ladisch Patent No. 2,571,457, is supplied with the filament-forming material in the form of a liquid stream (i. e. in the molten state which, in the case of soluble polymeric material, may be replaced by a polymeric solution), and with compressed vapor or gas (such as atmospheric air, nitrogen, carbon dioxide, steam and other vapors or gases inert to the polymer). The material moves through a straight tube 11 disposed axially of the nozzle, while the vapor or gas is forced to whirl in a spiral path within the nozzle with constant increase in velocity until it attains a very high thermal velocity, which may even be of the order of supersonic velocity, at a point which is outside the nozzle, and which is the vertex of the cone defined by the inner conical wall 12 of the nozzle. The material flows out of the tube due to pressure or gravity, and moves to said point or vertex, where it is subjected to powerful disruptive forces which form filaments as fine as one micron in diameter and several or many centimeters long. These filaments form thick, curly masses beyond the point or vertex, and the curly masses may be gathered and twisted to form a cord or cords for subsequent disposition as will be described, or may be collected as wool-like mats or deposited as mere shapeless piles.

Cellulose propionate filaments are preferably prepared by melt-spraying cellulose propionate resin at the temperature of 255° C., with a nozzle (air) pressure of 20 to 40 pounds per square inch, air temperature of 250° C. and inner tube pressures varying between 4 and 16 pounds per square inch, all as described in said Ladisch patent. The polystyrene fibers are conveniently prepared from commercial polystyrene resins by melt-spraying with an inner tube pressure of 5 pounds per square inch and a temperature of 310° C. at 25 pounds per square inch. Under these conditoins the filaments were homogeneous and had an average diameter of 80 microns.

In the case of glass as the filament-forming material, molten glass is set at a temperature at least about 250° C. higher than its softening point into the straight tube of the nozzle, and hot compressed gas (the gas being at a pressure of about 60 pounds per square inch) is fed into the hollow conical chamber of the nozzle at a temperature about 100° C. higher than the temperature of the molten glass. The molten glass and compressed gas contact at the vertex point just outside the pointed end of the nozzle, at which location the compressed gas has attained its maximum spiraling speed, which is almost or even more than supersonic. A very large entangled mass of an average diameter of about 6 microns (some of the fibers being as thin as 1 micron), is formed.

Figure 2:
Figure 2 is a partial side view taken along lines 2—2 of Figure 1.

If the filaments are collected as mats or piles, they are picked up and perhaps weighed, and then placed in a Carver press (or its equivalent) and subjected to heat and pressure. The temperature of the press plate may vary between 50° and 110° C., while the pressures may be between 500 and 2000 pounds per square inch. For some of the polymers, such as cellulose propionate, pronounced darkening and considerable fusing of the fibers or filaments will take place at 2000 pounds per square inch and 110° C. Only slight darkening and less fusing are observed at 1000 pounds per square inch and 110° C., and the product undergoing the lower pressure is much thicker. At 500 pounds per square inch the product is roughly four or five times as thick as the product subjected to 2000 pounds per square inch, and what fusing takes place seems to be almost entirely on the surface. Polystyrene subjected to 2000 pounds per square inch and 70° C. does not lose its whiteness but fuses fairly uniformly. All the panels made as described having porous surfaces, that is, the surfaces are not smooth and continuous, but are characterized by intermittent joining of the filaments with countless voids or air spaces between the filaments. See Figs. 1 and 2 which show, particularly in the sectional view of Fig. 2, a panel 20 characterized by substantially fused surface regions 21 and 22, and interior 23 which is either unfused or substantially less fused than surface regions 11 and 12.

Instead of heating the filamentous masses or coarse woven fabrics as described above, I may introduce electric heating wires before the described pressing or I may employ induction or electronic heating where heavy masses are to be heated and it is desired to fuse the filaments at a multitude of points both in the interior of the resultant panel and on or adjacent the surfaces thereof. Sometimes, as in making self-heating insoles, I may incorporate heat-generating chemicals which are inert to the plastic employed.

In lieu of panels with rough or broken surfaces because of the presence of many unfused filaments, I may provide visually smooth surfaces or outer "skins" by sealing the interstices with polymeric solutions, followed by heat treatment (and pressure if necessary) to expel the solvent in order to obtain a film of the polymer. Relatively smooth surfaces may also be formed by bonding fabrics such as canvas, cotton duck, gunny sack or glass cloth by resins or polymers to the porous panels formed as described. I may also form panels with one surface smooth, the other surface porous, due to the conjoint use of a hot platen and a cold or cooler platen, or a hot roll and a cold or cooler roll.

I also contemplate coating the panels with elastomers, applied either from a melt or from solutions or emulsions. The elastomers may be selected from the group comprising the following: polyisobutylene, polyisobutylene-diolefin synthetic rubber, polybutene, polychloroprene, polybutadiene, polybutadiene-styrene synthetic rubber, polybutadieneacrylonitrile synthetic rubber, polystyreneisoprene synthetic rubber, natural rubber, guttapercha, rubber hydrochloride, polyvinyl isobutyl ether, polyvinyl isopropyl ether, polyvinylmethyl ether, polyvinyl alcohol, polyvinyl acetate, polyvinyl butyral, polyvinyl chloride, polyvinyl chloride-vinylidene chloride copolymers, polyethylene, halogenated polyethylenes, polyalkylene sulfides, and silicones. The coatings will normally be sprayed on but in some instances may be applied by immersion, by heated rollers and in other known ways.

It is also within the contemplation of my invention to form panels from mixtures of various filamentous masses formed from different filament-forming materials, e. g. from a mixture of synthetic resinous mass and glass fiber mass, obtained by spraying from two or more converging nozzles 10, 10' onto the same collecting surface 13. This mixed mass is then formed into shape-sustaining panels of predetermined shape by heat and pressure as described in the foregoing specification. In this manner, it is possible to control the relative stiffness or flexibility of the panels of predetermined thickness by a proper selection of the starting materials; plus, while cellulose propionate alone forms a relatively supple panel, and glass alone forms a relatively stiff panel (unless its diameter is kept relatively very thin), a panel made from a mixed mass of cellulose propionate and glass will be of greater stiffness than the cellulose propionate panel, due to the presence of reinforcing glass fibers.

All the panels mentioned above may be shaped under pressure, or after a rough preliminary shaping in the press may be sawed or cut to shape. They are all characterized by intermittent joining or bonding of the filaments, with visibly porous surfaces except where outer "skins" are formed. These porous panels may "breathe," and are useful for a variety of purposes.

Having thus described several preferred forms of my invention and a number of methods by which the same may be carried into practice, I wish it to be understood that they are by way of example and not by way of limitation of the scope of my invention, inasmuch as departures from the specific embodiments and methods described herein may be made without, however, departing from the spirit of my invention. I thus define my invention by the appended claims.

I claim:

1. The method of forming a glass fiber reinforced resinous panel, comprising causing a filament-forming resinous material to flow in the liquid state through a first nozzle, subjecting said resinous material after it emerges from said first nozzle to a spiraling blast of a gas, said spiraling blast being in the shape of a hollow cone and moving with ever increasing velocity towards a point which is the vertex of said cone and which is outside said first nozzle, the spiraling blast surrounding said resinous material and encountering said resinous material near said vertex, said spiraling blast attaining a very high velocity and contacting said resinous material near said vertex, causing molten glass to flow through a second nozzle, the axis of flow of said molten glass converging with the axis of flow of said resinous material, subjecting said glass after it emerges from said second nozzle to a spiraling blast of a gas, said spiraling blast being in the shape of a hollow cone and moving with ever increasing velocity towards a point which is the vertex of said cone and which is outside said second nozzle, the spiraling blast surrounding said molten glass and encountering said molten glass near said vertex, said spiraling blast attaining a very high velocity and contacting said molten glass near said vertex, whereby an entangled mass of mixed resinous and glass filaments is formed, and compressing and heating said entangled mass of filaments until at least part of the filaments is fused to each other to form a panel whose surface regions are more strongly fused than its interior.

2. The process of claim 1, wherein said mass of filaments is fused at the surface regions of said panel only, the interior remaining unfused.

References Cited in the file of this patent

UNITED STATES PATENTS

| 2,437,263 | Manning | Mar. 9, 1948 |
| 2,476,283 | Castellan | July 19, 1949 |
| 2,497,117 | Dreyfus | Feb. 14, 1950 |
| 2,571,457 | Ladisch | Oct. 16, 1951 |
| 2,577,214 | Slayter | Dec. 4, 1951 |
| 2,689,199 | Pesce | Sept. 14, 1954 |